United States Patent [19]

Wessels

[11] Patent Number: 5,620,195
[45] Date of Patent: Apr. 15, 1997

[54] LOCKING SYSTEM FOR A SEMITRAILER SLIDING UNDERCARRIAGE WITH AIR PRESSURE PROTECTION VALVE

[75] Inventor: Larry L. Wessels, Lakewood, Colo.

[73] Assignee: Rocky Mountain Technology Engineering Corp., Lakewood, Colo.

[21] Appl. No.: 639,347

[22] Filed: May 1, 1996

Related U.S. Application Data

[63] Continuation-in-part of Ser. No. 442,988, May 17, 1995, abandoned, which is a continuation-in-part of Ser. No. 381,290, Jan. 31, 1995, Pat. No. 5,465,990, which is a continuation of Ser. No. 151,349, Nov. 12, 1993, abandoned, which is a continuation-in-part of Ser. No. 996,580, Dec. 24, 1992, Pat. No. 5,314,201.

[51] Int. Cl.$^6$ ................................................. B62D 53/06
[52] U.S. Cl. ................................................. 280/149.2
[58] Field of Search ........................... 280/405.1, 407.1, 280/149.2; 180/209

[56] References Cited

U.S. PATENT DOCUMENTS

| | | | |
|---|---|---|---|
| 3,993,361 | 11/1976 | Stelzer | 137/506 |
| 4,353,565 | 10/1982 | Smith et al. | 280/149.2 |
| 4,586,755 | 5/1986 | Worbois | 303/28 |

Primary Examiner—Paul N. Dickson
Attorney, Agent, or Firm—Edwin H. Crabtree; Ramon L. Pizavvo; Donald W. Margolis

[57] ABSTRACT

A locking system with air pressure protection valve mounted on a sliding undercarriage of a semitrailer, the semitrailer pulled by a tractor. The locking system is used for securing and releasing the sliding undercarriage from a pair of parallel rails mounted on an underside of the semitrailer. The locking system may be a pneumatic system or electro-pneumatic system and includes at least one air cylinder with piston. The air cylinder is mounted on the sliding undercarriage and disposed next to the parallel rails. A locking pin is attached to the piston with a portion of the locking pin inserted into selected locking pin hole in a locked position in the parallel rails. An air valve directs pressurized air to the air cylinder for retracting and extending the piston. The air pressure protection valve is attached between a pressurized air source and the air valve and prevents the operation of the air valve if the air pressure in the pressurized air source drops below a predetermined amount of air pressure. The locking system with air pressure protection valve may also include a plurality of air cylinders with pistons attached to locking pins for retracting and extending the pins in locking pin holes in the parallel rails.

20 Claims, 4 Drawing Sheets

LOCKING SYSTEM FOR A SEMITRAILER SLIDING UNDERCARRIAGE WITH AIR PRESSURE PROTECTION VALVE

This application is a continuation-in-part application of patent application Ser. No. 08/442,988 filed on May 17, 1995, now abandoned, having a title of "LOCKING SYSTEM FOR A SEMITRAILER SLIDING UNDERCARRIAGE WITH AIR PRESSURE PROTECTION VALVE".

The patent application having Ser. No. 08/442,988 is a continuation-in-part application of an application Ser. No. 08/381,290 filed on Jan. 31, 1995 now U.S. Pat. No. 5,465,990 which is a continuation application of an application Ser. No. 08/151,349 filed on Nov. 12, 1993, now abandoned, which is a continuation-in part application of an application Ser. No. 07/996,580 filed Dec. 24, 1992 now U.S. Pat. No. 5,314,201, by the subject inventor and having a title of "LOCKING SYSTEM FOR A SEMITRAILER SLIDING UNDERCARRIAGE".

BACKGROUND OF THE INVENTION (a) Field of the Invention

This invention relates to a system for securing a sliding undercarriage to a semitrailer and more particularly, but not by way of limitation, to a fail-safe system with an air pressure protection valve used with a sliding undercarriage for securing the undercarriage to a pair of parallel rails on the underside of a semitrailer.

(b) Discussion of Prior Art

A common truck transportation system in the United States is a tractor pulling a semitrailer. The tractor has an engine, transmission, steerable front axle with wheels and one or more rear drive axles and wheels. The tractor is attached to a semitrailer through a fifth wheel which is located over the tractor's rear drive axle. The semitrailer rides on a running gear or called herein a "sliding undercarriage". The sliding undercarriage includes a suspension, one or more unpowered axles, wheels, a pneumatic brake system and a locking pin release system. The sliding undercarriage is slidable along a portion of the length of the underside of the semitrailer.

Today, federal and state laws define weight limits per axle for tractors and semitrailers. Fines are imposed at each state port-of-entry if load limits are exceeded. By shifting the sliding undercarriage under the semitrailer, the driver can improve the balance of load between the tractor and the semitrailer to meet highway axle weight limit requirements. Also, to improve maneuverability on city streets, the sliding undercarriage can be shifted toward the tractor to shorten the unit's turning radius.

The sliding undercarriage is typically locked between two parallel rails that are integral to the structure of the bottom frame of the semitrailer. Lateral movement relative to the semitrailer is limited to the clearance between the two rails and the sliding undercarriage frame. The sliding undercarriage can be moved longitudinally, generally five to seven feet, under the semitrailer by sliding along and between the two rails. The sliding undercarriage is locked to the semitrailer rails by a system of usually two or four steel pins that are part of the sliding undercarriage frame. The pins are aligned in opposing pairs in the sliding undercarriage structure and in a locked position project outward through locking pin holes in the rails. The locking pin holes are generally spaced three to six inches apart along the rails. The locking pins are usually spring loaded to retain them in a locked position during highway travel. The locking pins are retracted and reinserted in the locking pin holes using a manually operated locking pin release system.

Semitrailers ate commonly equipped with pneumatic spring brake systems which typically operate at 90–120 psi. The spring loaded air brakes are automatically set by the springs when air pressure is removed through a control in the tractor which vents the supply air line and spring brake air lines to the atmosphere. To release the air brakes, air pressure from the tractor compressor is routed through the supply air line and a relay valve to apply pressure from the air supply tank to overcome the brake spring bias force.

The most common way to reposition the sliding undercarriage under the semitrailer is through a process of trial and error. The driver locks the brakes on both the tractor and semitrailer. The driver then climbs out of the tractor, walks to the sliding undercarriage, and pulls or lifts the manually operated locking pin release lever which is usually positioned immediately ahead of or between the left wheels of the sliding undercarriage. Most Original Equipment Manufacturer (OEM) manually operated locking pin release systems are a mechanical apparatus designed to rotate when the locking pin release lever is pulled or lifted. The pins are retracted by a pulling or a lifting force transmitted through a series of linkages designed to provide a mechanical advantage to overcome the spring loaded locking pin retention force. The pin release apparatus usually includes provisions to hold the lever and locking pins in the retracted position while the driver returns to the tractor. The driver then releases the brakes on the tractor while leaving the brakes applied on the semitrailer's sliding undercarriage. The tractor is then driven forward or backward to slide the semitrailer relative to the sliding undercarriage. The driver, after sliding the semitrailer the distance considered correct, then reapplies the tractor brakes. The driver again leaves the tractor, walks back to the sliding undercarriage, and releases or pushes down the pin release lever. The spring loaded locking pins are usually not perfectly aligned to reinsert through locking holes. Each locking pin, when not fully reinserted, i.e. pressed by the locking pin retaining spring against the rail at a location between two locking pin holes. The driver returns to the tractor, releases the tractor brakes, and moves the semitrailer only a few inches or lees as required for the spring loaded pins to drop into the first holes in the rails that move into alignment. The driver must then reapply the brakes and walk around the semitrailer to visually verify that all pins are in locked positions. The driver then secures the locking pin release lever to the sliding undercarriage for highway travel.

The process of retracting the locking pins and sliding the bottom side of the semitrailer over the sliding undercarriage is more easily completed with the assistance of a second person. The second person pulls or lifts the locking pin release lever and assists the driver in repositioning the sliding undercarriage under the semitrailer The manually operated pin retraction systems can become impossible to operate due to damage or corrosion of the linkage and contamination with dirt and ice from exposure under the semitrailer. Locking pine can also become stuck in the holes in the rails if the semitrailer is parked on an incline or positioned with a slight twist in the frame. Pins are often loosened only by pounding them out with hammers. The usual procedure to loosen stuck locking pins is to apply the brakes on the sliding undercarriage and rock the semitrailer by repeatedly driving the tractor forward and backward a few inches. The assistant provides a constant pull on the pin release lever to apply the maximum force possible to overcome the locking pin springs and withdraw the pins if they become loose. Similar problems are often encountered in trying to reinsert locking pins. Extra force and assistance to align individual pins may be required to reinsert locking pins into new locking holes after the sliding undercarriage has been repositioned. The locking pin linkage can be damaged, bent, or twisted during attempts to loosen stuck pins. Distorted linkage may limit the distance that locking pins can be reinserted and make it impossible to reinsert pins into locked positions. The assistant positioned under the semitrailer near the wheels during attempts to loosen stuck locking pins or reinsert pins can be seriously injured. Bad weather such as rain, ice, and snow increase the probability of injury to an assistant positioned near the sliding undercarriage wheels. Fatalities related to attempts to retract and reinsert the locking pins have been reported.

The Department of Transportation highway port-of-entry weigh stations and routine highway safety inspections include verification per 49 CFR 393.207(b) that all locking pins are properly inserted. Fines may be imposed and vehicles designated out-of-service until maintenance is completed. According to this federal agency, highway accidents have been caused by locking pins not being properly inserted for securing the sliding undercarriage to the semitrailer rails.

The problems inherent in retracting and inserting locking pins with the above mentioned manually operated pin retraction apparatus have been recognized in U.S. Pat. No. 4,944,522 to Hart, U.S. Pat. No. 4,838,578 to Baxter, U.S. Pat. No. 4,353,565 to Smith et al., U.S. Pat. No. 4,286,797 to Mekosh et al., U.S. Pat. No. 3,778,079 to Vornberger, U.S. Pat. No. 3,618,969 to Glassmeye, U.S. Pat. No. 5,199,732 to Lands et al., and U.S. Pat. No. 5,137,296 to Forman.

The above mentioned patents to Hart and Baxter provide means to modify the manually operated pin retraction apparatus. The modified systems as described do not provide sufficient force to retract stuck locking pins, especially when complicated by corrosion, damage or contamination. Also, the flexibility of the modified linkage described in these patents is an inefficient means to reinsert looking pins into the locking pin holes. Also, bent linkage may actually prevent the locking pins from being fully inserted into locked positions even when the control lever position indicates that all pins are locked.

In the patents to Smith et al. and to Mekosh et al. complex electromechanical and pneumatic systems are disclosed that require extensive structural modifications to the semitrailer and possibly to the tractor. The patent to Smith et al. describes a few of the features incorporated into the novel system described herein, but the Smith et al. disclosure, for example, does not include a fail-safe system wherein a pressure transducer provides control to automatically reinsert the locking pins should a semitrailer's spring brakes be released when the looking pins are retracted. Also, the fail-safe system prevents the locking pins from being retracted unless the driver sets the semitrailer brakes before adjusting the sliding undercarriage on the semitrailer.

The patents to Lands et al. and Forman provide air operated cylinders and locking pins which are pneumatically released by the cylinders. But the systems described in these two patents do not provide a fail-safe all pneumatic system which prevents the locking pins from being retracted unless the semitrailer brakes are set and will automatically reset the pins if air pressure is applied to release the semitrailer brakes.

It is important to note that Department of Transportation Motor Carrier Safety Regulation 49 CFR 393.207(b) addresses the unsafe practice of entering highways with locking pins not inserted into the semitrailer's locking pin holes. This is an out-of-service violation per 49 CFR Chapter III, Subpart G, Appendix A to Part 386, and provides fines per violation up to $1,000 to a driver and $10,000 to a motor carrier. This regulation is enforced by each state, i.e., Colorado Revised Statute 42-4-234(1)(A) as amended and enforced by the Department of Public Safety Motor Carrier Safety Unit, Colorado State Patrol. The fail-safe elements of the subject system as described herein assists drivers and motor carriers in complying with the above federal and state regulations. Also, none of the above mentioned patents disclosed the unique fail-safe features and advantages of the subject locking system as described herein for improved efficiency and safety in the adjustment of the sliding undercarriage on the underside of a semitrailer.

SUMMARY OF THE INVENTION

In view of the foregoing, it is a primary object of the invention to provide a truck driver and truck owner the benefit of a reliable and fail-safe system which can easily reposition a sliding undercarriage on a semitrailer without potential injury to the driver or assistant. Also, over axle weight and out-of-service violations will decrease as a result of the simplified sliding undercarriage repositioning procedure.

Another object of the present invention is to provide a system with air pressure protection valve wherein each locking pin is independently retracted and inserted by a double acting air cylinder. The system is designed to transmit adequate force, i.e. over 150 pounds, directly to each locking pin and reliably retract pine stuck in a semitrailer's locking pin holes. The air pressure protection valve prevents the retraction of locking pins when air pressure drops below a predetermined amount.

A further object of the fail-safe locking system is the locking pin can only be retracted when the pressure in the semitrailer's spring brake chambers is vented to apply the spring brakes on the semitrailer. If the spring brakes on the semitrailer have not been set, an air pressure switch connected to an air valve prevents the air valve from actuating the air cylinders to retract the locking pins.

Another object of the new system is if the air pressure protection valve closes because of a drop in air pressure from the air pressure source, the locking pin springs are used to retain each locking pin in a locked position in the semitrailer rails during highway travel.

Still another object of the invention is the system does not affect the operation of the tractor or semitrailer's electrical or pneumatic system. Specifically, the operation of the semitrailer's pneumatic spring brake system is not effected by the system's elements, unlike some prior art systems.

Yet another object of the invention is the simplicity and low cost of the locking system. Also, the installed cost of the system is comparable to the standard manually operated pin removal mechanism currently used on semitrailers. Further, the system can easily be installed as original equipment on the semitrailer's sliding undercarriage or retrofited on semitrailers already in use.

The subject locking system is mounted on a sliding undercarriage of a semitrailer, the semitrailer pulled by a tractor. The locking system is used for securing and releasing the sliding undercarriage from a pair of parallel rails mounted on an underside of the semitrailer, the parallel rails having spaced apart locking pin holes along it's length. The locking system is a pneumatic system or electro-pneumatic system and includes one or more air cylinders with piston. The air cylinder is mounted on the sliding undercarriage and disposed next to the parallel rails. A locking pin is attached to each piston with a portion of the locking pin inserted into selected locking pin holes in a locked position in the parallel rails. An air valve is connected to the air cylinder and a pressurized air source on the semitrailer. The air valve directs pressurized air to the air cylinder for retracting and extending the piston. An air pressure protection valve is attached between the pressurized air source and the air valve and prevents the operation of the air valve if the air pressure in the pressurized air source drops below a predetermined amount of air pressure. An air pressure switch is connected to a pressurized air source to the semitrailer air brakes. The air pressure switch is connect to and controls the operation of the air valve when retracting the locking pin from the locking pin hole. The air pressure switch allows pin retraction only when air pressure is released to the semitrailer air brakes and spring brakes on the semitrailer are set. A pin release lever or release button is attached to the air valve and is used for releasing the locking pin when the spring brakes nave been set.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

PIG. 2 is a perspective view of the sliding undercarriage mounted on a pair of axles with wheels and shown removed from the underside of the semitrailer.

Figure 3:
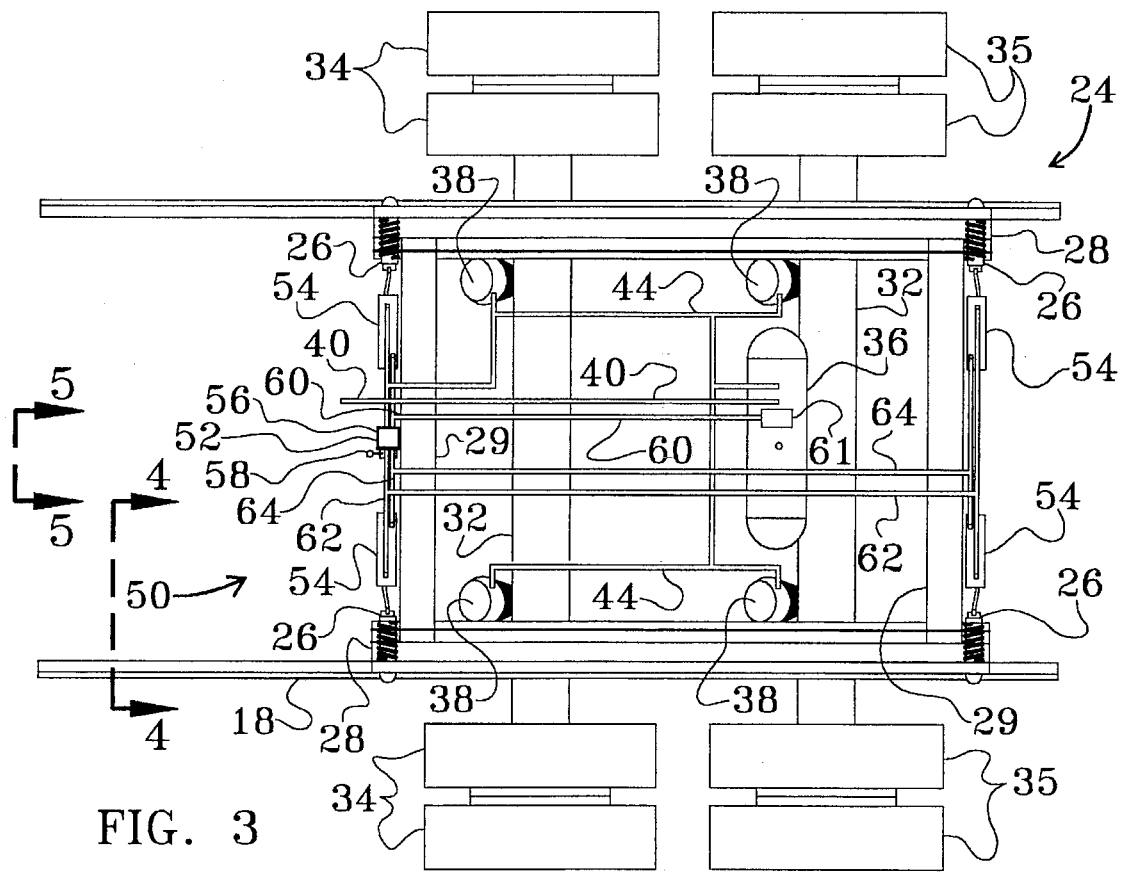

FIG. 3 is a top view of the sliding undercarriage with the subject locking system mounted thereon.

Figure 4:
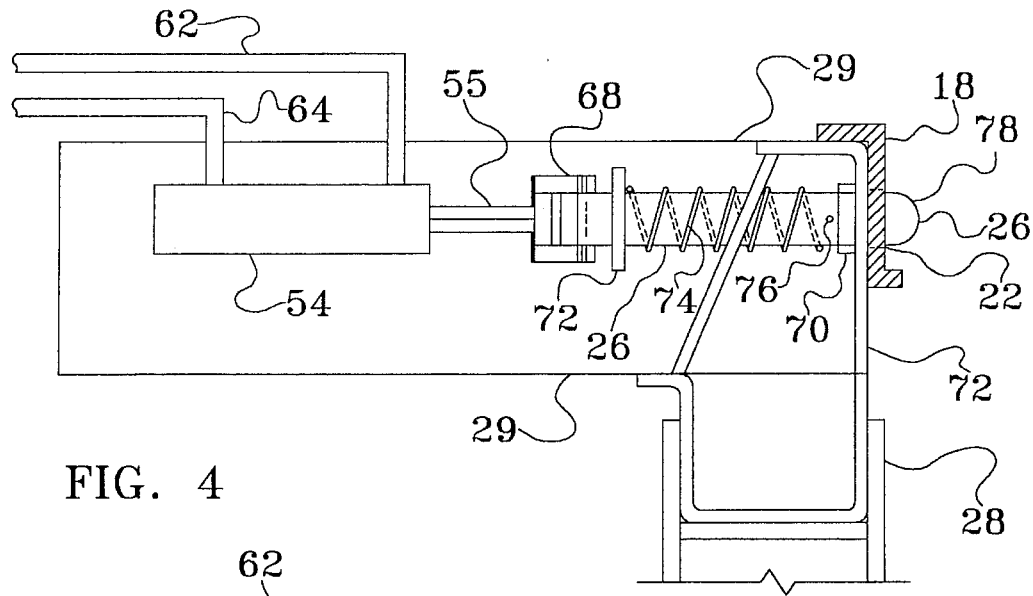

FIG. 4 is an enlarged front view of a locking pin and air cylinder with the locking pin received in a locking pin hole in one of the semitrailer's parallel rails. This view is taken along lines 4—4 shown in FIG. 3.

Figure 4A:
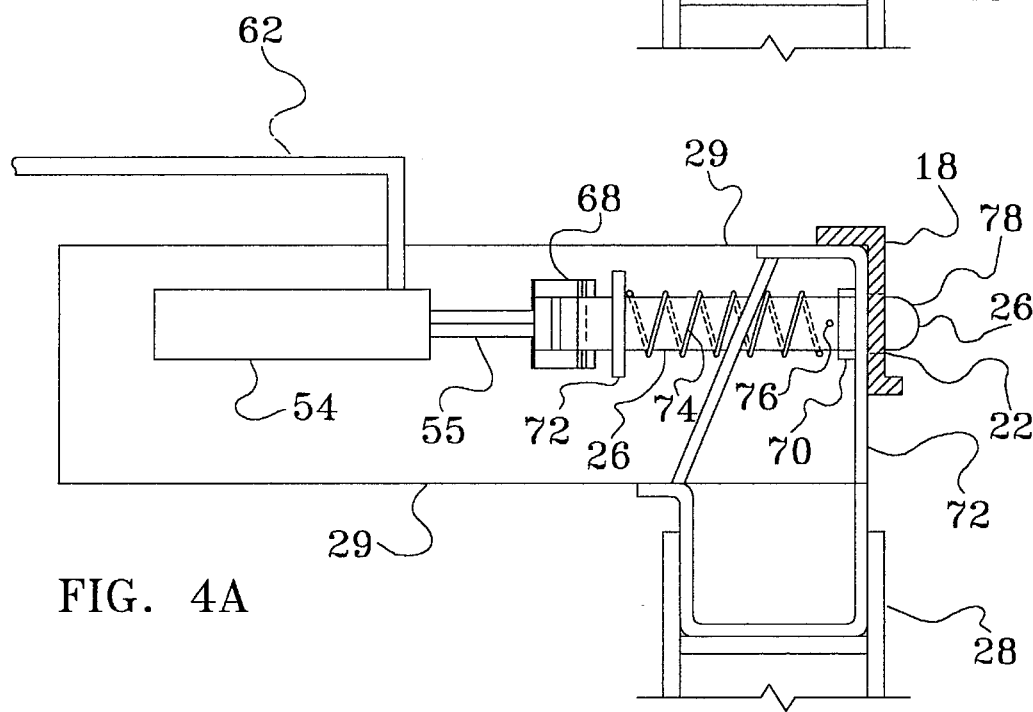

FIG. 4A is similar to FIG. 4 wherein the locking pin is retracted using a single acting air cylinder and a coil spring is used for inserting the locking pin in the locking pin hole.

Figure 4B:
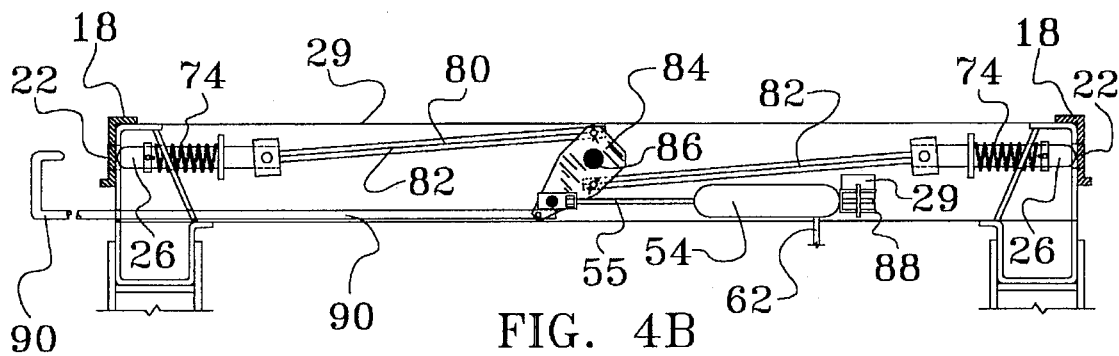

FIG. 4B is similar to FIG. 4A, but in this example the single acting air cylinder and piston are connect to a standard mechanical linkage system with coil springs used for retracting and extending the locking pins in locking pin holes.

Figure 5:
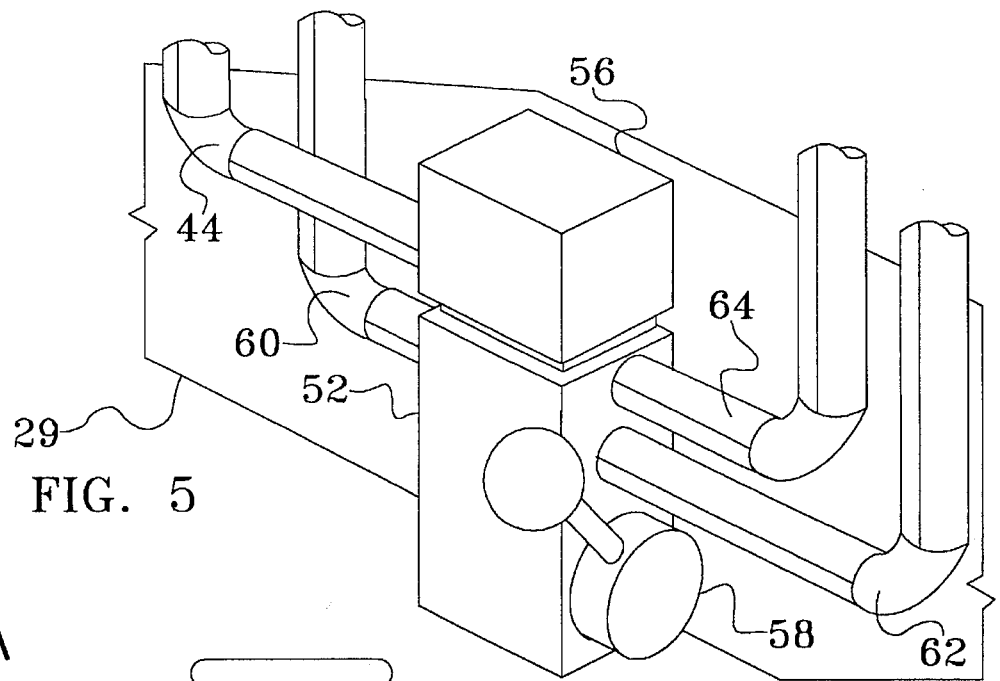

FIG. 5 is an enlarged front view of the air pressure switch and the air valve with pin release lever. This view is taken along lines 5—5 shown in FIG. 3.

Figure 6:
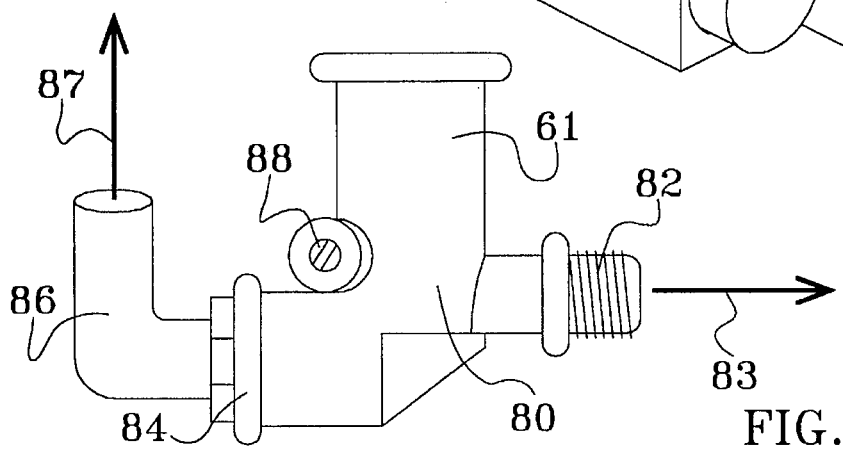

FIG. 6 is a side view of the air pressure protection valve which is attached to the semitrailer's supply air tank.

DESCRIPTION OF THE PREFERRED EMBODIMENTS

In FIG. I a side view of a typical highway truck is shown having a general reference numeral 10. The truck 10 includes a tractor 12 with cab 14 with the tractor 12 pulling a semitrailer 16. The semitrailer 16 includes an electrical power source from the tractor 12. The semitrailer 16 has a pair of parallel rails 18 mounted on an underside 20 of the semitrailer 16. The rails 18 include a plurality of pin locking holes 22 along the length thereof. The holes 22 are generally spaced 3 to 6 inches apart. A sliding undercarriage, having a general reference numeral 24, is locked to the rails 18 using two or more locking pins 26.

Figure 1:
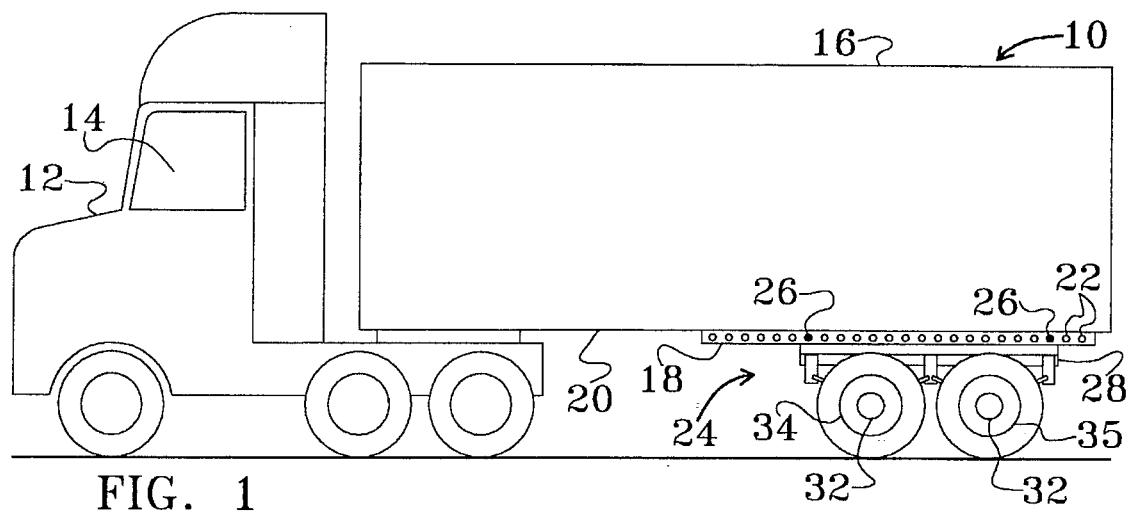
FIG. 1 is a side view of a typical highway tractor and semitrailer with a longitudinally sliding undercarriage mounted on the underside of the rear of the semitrailer.
Figure 2:
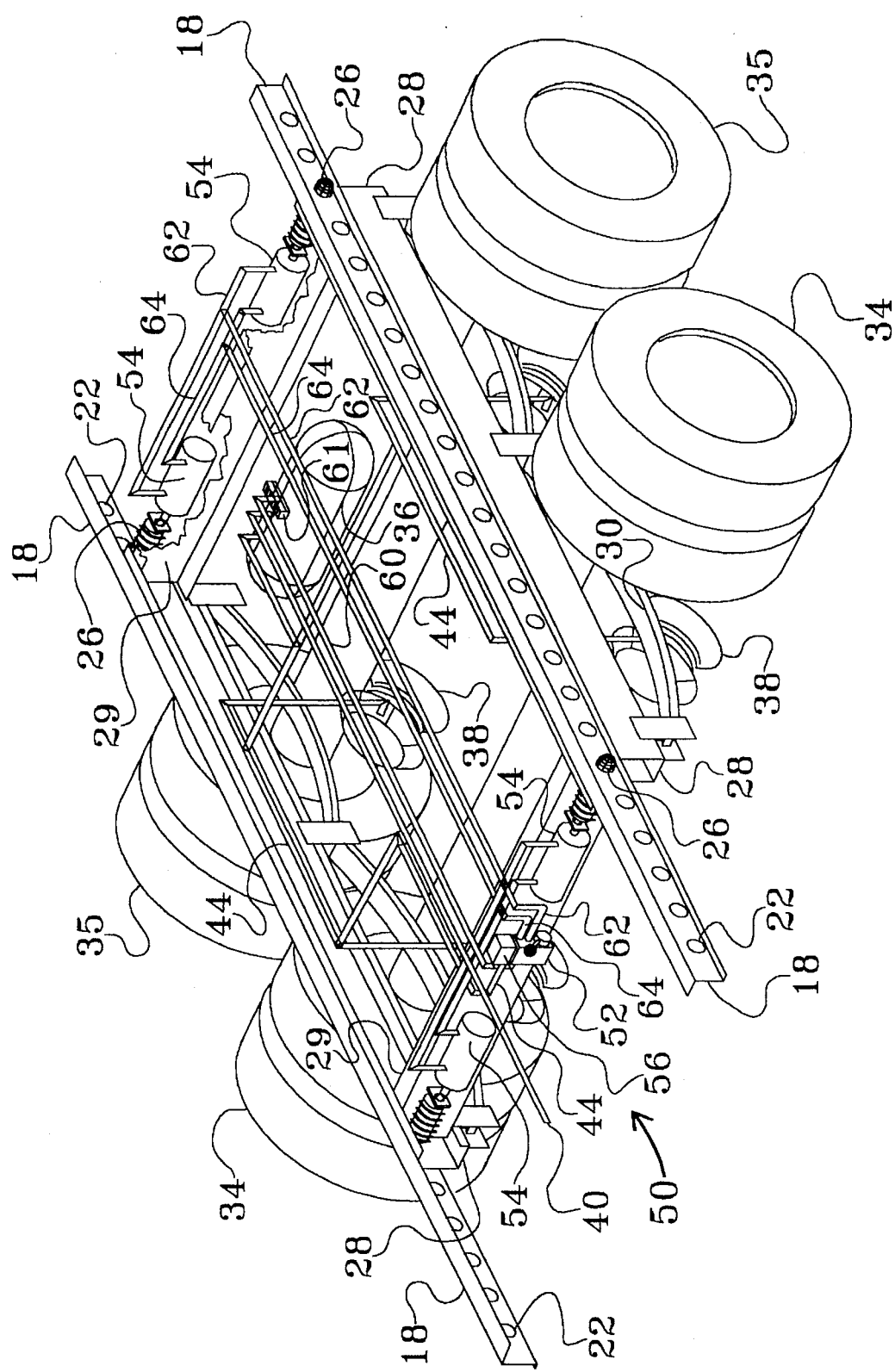

Referring now to both FIGS. 1 and 2, the sliding undercarriage 24 includes an axle frame 28 with cross members 29, a spring suspension 30 attached to the frame 28, a pair of axles 32 attached to the spring suspension 30 and tandem front wheels 34 and tandem rear wheels 35 mounted on the axles 32. Also, the undercarriage 24 includes a semitrailer supply air tank 36 which supplies compressed air to spring operated air brakes 38. When air pressure is applied to the air brakes 38, the spring bias force in the air brakes is overcome unlocking the braking force on the semitrailer's wheels 34 and 35 and the semitrailer 16 is free to move. When the air pressure is vented or cut off for any reason, the spring bias force of the air brakes 38 is applied and a constant braking force is applied the wheels 34 and 35. The tank 36 receives pressurized air from a tractor air compressor via a supply air line 40. The air compressor is mounted on the tractor 12 and not shown in the drawings. An air brake relay value 42 is mounted on the frame 28 and connected to the air line 40 for directing pressurized air from the air compressor to the supply air tank 36 and from supply air tank 36 to each of the semitrailer's air brakes 38 via air brake lines 44.

Heretofore, the sliding undercarriage 54 was adjusted along the length of the rails 18 using the above mentioned manually operated pin release mechanism which was attached to pins 26 using a linkage system. The prior art pin release mechanism is not shown in the drawings. The manually operated release lever was mounted either in front of the front wheels 34 or between the front wheels 34 and rear wheels 35. The prior art manually operated pin release mechanism is difficult to operate if the semitrailer is parked with a slight twist in the frame, the mechanism is bent or damaged, or one or more pins 26 are stuck inside the locking pin holes 22. Also, it can be appreciated that since the mechanism is next to or between the wheels 34 and 35, the operation of changing the location of the sliding undercarriage 24 manually pulling or lifting the release lever while the driver is moving the tractor to loosen stuck pins is dangerous to the assistant. The subject looking system for a semitrailer sliding undercarriage as described herein provides a reliable system to retract pins and eliminates the use of the manually operated pin release mechanism for greater safety and reliability when adjusting the sliding undercarriage 24.

Referring now to FIG. 2 which is a perspective view of the sliding undercarriage 24, to FIG. 3 which is a top view of the sliding undercarriage 24, and to FIG. 5 an enlarged front view of the subject locking system which is mounted on the undercarriage 24 and has a general reference numeral 50. The locking system 50 broadly includes an air valve 52, one or more single or double acting air cylinders 54 with pistons 55 connected to the locking pins 26, an air pressure switch 56 mounted on one end of the air valve 52, and a pin release lever 58 mounted on an opposite end of the air valve 52. The air valve may be operated pneumatically or electrically. While the subject locking system 50 is discussed herein operating two or four air cylinders 54 with pistons 55 connected to locking pins 26, it can be appreciated that the locking system 50 can be used with a single air cylinder 54 with piston 55 for pulling a locking pin 26 or the piston 55 connected to a mechanical linkage for pulling the locking pin 26. While the air cylinder 54 is shown in the drawings, the air cylinder 54 can be replaced by using an air operated brake pad of similar pneumatically operated devices without departing from the spirit and scope of the invention. The locking system 50 may be operated pneumatically as discussed herein or may be used in combination with the semitrailer's electrical system. Also, the system 50 if desired can be incorporated into the semitrailer's manual pin linkage system which is the current standard method of manually pulling locking pins when changing the position of the sliding undercarriage 24.

In FIGS. 2 and 3, the air valve 52 is connected to the supply air tank 36 by air valve air line 60. Attached to the supply air tank 36 and the air valve air line 60 is an air pressure protection valve 61. The air pressure protection valve 61 prevents the operation of the air valve 52 when the pressurized air from the supply air tank falls below a predetermined amount. The air protection valve 61 is shown in greater detail in FIG. 6. The air pressure switch 56 is connected to the semitrailer's air brake lines 44. Also, the air valve 52 is connected to each of the locking systems air cylinders 54 by way of an air line 62 used retracting the piston 55 in the air cylinder 54 and an air line 64 used for extending the piston 55 and inserting the locking pine 26 in pin locking holes 22. The air lines 62 and 64 are clearly shown connected to one of the air cylinders 54 in FIG. 4. It should be noted that depending on the semitrailer manufacturer, the semitrailer 16 with parallel rails 18 may use a pair of locking pins 26 or two pair or four locking pine 26. In FIGS. 2 and 3 a second pair to locking pine 26 is connected to air cylinders 54 shown at the rear of the sliding undercarriage 24. For simplicity in describing the subject locking system 50, the air lines the second pair of air cylinders 54 is not discussed. It can be appreciated float to those skilled in the art of dealing with air systems used on trucks and trailers that the hook up of the second pair of air cylinders 54 would be similar as described above.

In FIG. 4 a front view of a portion of the axle frame 28 and one of the cross members 29 is shown taken along lines 4—4 shown in FIG. 3. Also, one of the parallel rails 18 is shown in cross section. In this view, the air cylinder 54 is secured to the side of the cross member 29 using a mounting bracket 66. The piston 55, which is part of the air cylinder 54, is pivotally attached to the locking pin 26 using a swivel connector 68. The locking pin 26 is attached to the axle frame 28 by a bushing 70 mounted on an angular shaped upper portion 72 of the frame 28. The locking pin 26 includes a coil spring 74 received around a portion of the length of the pin 26 and held in compression between a spring pin 76 mounted on the locking pin 26 and part of the upper portion 72 of the frame 28. The coil spring 74 acts to bias the locking pin 26 toward engagement of a chamfered end 78 of the pin 26 through one of the locking pin holes 22 as shown in this drawing. The air cylinder 54 is shown in this drawing pressurized to force the locking pin 26 into an extended and locked position in one of the pin holes 22 of the rail 18. When the air pressure to the cylinder 54 is reversed, the pin 26 is moved from right to left and in an unlocked or disengaged position from the rail 18. The sliding undercarriage 24 is now free to be adjusted along the length of the rails 18. The pressure to the air cylinders 54 through the air line 64 continually force the locking pins into locked positions.

FIG. 4A is similar to FIG. 4 and also shows a portion of the axle frame 28 and one of the cross members 29 taken along lines 4—4 shown in FIG. 3. In this view, the air cylinder 54 is a single acting cylinder connected to air line 62 for receiving air pressure therefrom and retracting the locking pin 26 from the locking pin hole 22. In FIG. 4A, the locking pin 26 is shown in an extended position with a portion of the locking pin 26 received in the locking pin hole 22. In this embodiment, the coil spring 74 is used to insert the pin 26 in the locking pin hole 22. When the air cylinder 54 receives pressurized air from the air line 62 using the air valve 52, the pin 26 is moved from right to left compressing the coil spring 74 and into an unlocked position from the rail 18. The sliding undercarriage 24 is now free to be adjusted along the length of the rails 18.

It should be noted that since the air cylinder 54 is a single acting cylinder for retracting the locking pin 26, when the air pressure drops in the locking system 50 and below a predetermined point, the bias force of the compressed coil spring 74 will overcome the dropping air pressure and will automatically insert the locking pin 26 in the locking pin hole 22 as shown in FIG. 4A.

In FIG. 4B, a sectional view of the axle frame 28 and one of the cross members 29 is shown with a standard mechanical linkage system 80 having one end of a pair of link arms 82 connected to the locking pins 26 and having the coil springs 74 received therearound. The other end of the link arms 82 are attached to a link arm mounting plate 84 which is rotated on a pivot axle 86. The mounting plate 84 is also attached to the piston 55 of the single acting air cylinder 54. In this view, the air cylinder 54 is shown secured to the side of the cross member 29 using a cylinder mounting bracket 88. The single acting air cylinder 54 is connected to the air line 62 for receiving air pressure therefrom and retracting the locking pins 26 from the locking pin holes 22 as shown in this drawing. In this added embodiment, the coil springs 74 are used to insert the pins 26 in the locking pin holes 22. When the air cylinder 54 receives pressurized air from the air line 62 using the air valve 52, the pins 26 are moved outwardly away from the locking pin boise 22. At this time, the pins 26 compress the coil springs 74 and move into an unlocked position from the rail 18. Also if required, a handle release bar 90 may be attached to the mounting plate 84 to assist the air pressure force in releasing the locking pins 26 from the locking pin holes 22. The sliding undercarriage 24 is now free to be adjusted along the length of the rails 18. Since the air cylinder 54 is a single acting cylinder and used for retracting the locking pins 26, when the air pressure drops in the looking system 50 and below a predetermined point, the bias force of the compressed coil springs 74 will overcome the dropping air pressure and will automatically insert the locking pins 26 in the locking pin holes 22. As mentioned above, this is still another example of the use of the locking system 50 with the air pressure protection valve 61 for improving the operation and safety of retracting and extending locking pins 26 in the locking pin holes 22 in conjunction with a standard mechanical linkage system 80.

Referring to FIG. 6, a side view of the air pressure protection valve 61 is shown which is attached to the supply air tank 36 and the air valve air line 60. During the operation of the air valve 52, the air pressure protection valve 61 will prevent the operation of the air valve 52 from retracting the locking pins 26 should the pressurized air from the supply air tank 36 fall below a predetermined amount, for example in a range of 50 to 80 psi.

The locking pin system 50 operates efficiently when the air supply tank pressure is above 90 psi. The pressure protection valve 61 senses when the air supply tank pressure is above 90 psi and allows the locking pin system 50 to operate efficiently in retracting and extending the locking pins 26. The pressure protection valve 61 will also sense when the air pressure in the supply air tank 36 is below, for example 80 psi, and will stop the air flow from the supply air tank 36 to the locking pin system 50. This feature is extremely important in that should the locking pin system 50 have an air leak, the pressure protection valve 61 prevents the depletion of air pressure in the supply air tank 36 in the operation of the semitrailer's air brake system. Also, the air pressure protection valve 61 is important to the locking pin system 50 as another safety feature to insure that the locking pins 26 can not be removed from the locking pin holes 22 without sufficient air pressure to reinsert the locking pins 26 in newly selected pin holes 22.

The air pressure protection valve 61, as shown in FIG. 6, includes a housing 90 with threaded nipple 92. The nipple 92 is attached, as indicated by arrow 93, into the side of the supply air tank 36. The housing 90 also includes an air discharge port 94 for receiving a fitting 96 which is used for connection to the air valve air line 60, as indicated by arrow 97. Mounted inside the housing 90 is a spring mounted valve or ballcock valve which can be adjusted for opening and closing the valve therein to a preset air pressure using a threaded air pressure screw 98.

Operation of Locking System

The operation of the locking system 50 will now be described in conjunction with a discussion of FIGS. 5 and 6 of the drawings. As background information, it should be mentioned that the air valve 52 receives air pressure from the supply air tank 36 for the operation of the air cylinders 54. The pressure in the semitrailer's air brake system is monitored by the air pressure switch 56. It has been found that semitrailer supply air tanks typically have threaded plugs which are provided by the tank manufacturer to allow devices such as an air spring suspension or power lift platform to be added to the semitrailer. Therefore, connecting the air valve 52 and air cylinders 54 to the semitrailer's air tank 36 and adding air pressure switch 56 for monitoring pressure in the air brake system does not effect the operation of the semaitrailer's air brake system. It is important to note the air pressure switch 56 prevents operation of the air valve 52 and is a fail-safe feature of the locking system 50. If the air brake system is pressurized, then the air brakes 38 have been released and therefore the air pressure switch 56 is in pressurized and the pin release lever 58 is prevented from operating the air valve 52 and applying air pressure through the air line 62 for having the air cylinders 54 retract the locking pins 26. Air valve 52 in the fail-safe position does provide air pressure to the air cylinders 54 through the air line 64 continually force the locking pins 26 into locked positions.

As mentioned in the discussion of FIG. 6, the air pressure protection valve 61 is shown which is attached to the supply air tank 36 and the air valve air line 60. During the operation of the air valve 52, the air pressure protection valve 61 will prevent the operation of the air valve 52 from retracting the locking pins 26 should the pressurized air from the supply air tank 36 fall below a predetermined amount. Also, the valve 61 prevents the bleeding of air pressure from the supply air tank 36 to insure there is sufficient air pressure for operating the semitrailer's brakes.

If the semitrailer's air brakes 38 are set by venting the air pressure via air brake lines 44 to the air brakes 38, then the air pressure is vented to the air pressure switch 56. When this occurs, the operator of the truck 10 or an assistant can now operate the pin release lever 58 on the air valve 52 for retracting the locking pins 26. While the pin release lever 58 is shown it can be appreciated that a pin release button or any other type of release mechanism can be used equally well in the operation of the air valve 52. At this time the air valve 52 directs air pressure through air line 62 to the two air cylinders 54 to actuate the cylinders and retract the pistons 55 which in turn retract the locking pins 26 from the parallel rails 18. The air pressure force, over 150 pounds, is sufficient to remove the pins 26 from the rails 18 even though the pins 26 may be stuck inside the locking pin holes 22 of the rails 18. When the cylinders 54 are actuated, the air pressure on the opposite side of the piston 55 is vented through air line 64 and the air valve 52.

When the locking pins 26 have been removed from the parallel rails 18, the semitrailer 16 is now ready to be repositioned on the sliding undercarriage 24. After the driver has properly repositioned the semitrailer 16 at a new location on the sliding undercarriage 24, the pin release lever 58 is used to reverse the direction of air pressure from the air line 64 and now through the air line 62 to again extend the pistons 55 and the locking pins 26 into a locked position in newly selected pin locking holes 22. Air pressure on the opposite end of the air cylinder 54 is now vented through air line 62 and the air valve 52.

The above reinsertion of the locking pins 26 into newly selected pin holes 22 can also be accomplished by the driver of the truck 10 pressurizing the semitrailer's air brakes 38 to release the brakes. At this time the air pressure switch 56 senses the increase in air pressure and opens the air valve 52. Automatically, air pressure is directed through the air valve 52 and air line 64 to extend the pistons 55 of the cylinders 54 for extending the locking pins 26 into a locked position. As mentioned under FIGS. 4A and 4B, if single acting air cylinders 54 are used, the compressed coil springs 74 will automatically return the locking pins 26 into locked positions.

Upon completion of the changing of the position of the semitrailer 16 on the sliding undercarriage 24 using the subject fail-safe locking system 50, if the semitrailer's air brakes 38 are still set, air pressure can now be applied to the air brakes 38 by the driver to release the brakes. The tractor 12 and semitrailer 16 are now ready for being driven safely on the highway.

While the invention has been particularly shown, described and illustrated in detail with reference to-the preferred embodiments and modifications thereof, it should be understood by those skilled in the art that the foregoing and other modifications are exemplary only, and that equivalent changes in form and detail may be made therein without departing from the true 'spirit and scope of the invention as claimed, except as precluded by the prior art.

The embodiments of the invention for which an exclusive privilege and property right is claimed are defined as follows:

1. A locking system for mounting on a sliding undercarriage of a semitrailer, the semitrailer pulled by a tractor, the locking system used for securing and releasing the sliding undercarriage from a pair of parallel rails mounted on an underside of the semitrailer, the parallel rails having spaced apart locking pin holes along the length thereof, the sliding undercarriage having spring operated air brakes operated from a pressurized air source on the semitrailer or tractor, the semitrailer having an electrical power source thereto, the locking system comprising:

a locking pin;

locking pin insertion and retraction means attached to said locking pin for inserting and retracting said locking pin in a selected locking pin hole in the parallel rails, said insertion and retraction means attached to the sliding undercarriage; and an air pressure protection means connected to said locking pin insertion and retraction means and connected directly to the pressurized air source on the semitrailer to prevent the depletion of air pressure in the pressurized air source in the operation of the semitrailer's air brakes, said pressure protection means further preventing the operation of said locking pin insertion and retraction means when the pressurized air from the pressurized air source drops below a predetermined amount.

2. The locking system as described in claim 1 further including a pair of locking pins, said locking pin insertion and retraction means attached to said locking pins for inserting and retracting said locking pins in selected locking pin holes in the parallel rails.

3. The locking system as described in claim 1 wherein said locking pin insertion and retraction means is an air cylinder with a piston, said air cylinder mounted on the sliding undercarriage, said piston attached to said locking pin.

4. The locking system as described in claim 3 wherein said air cylinder is a single acting air cylinder.

5. The locking system as described in claim 3 wherein said air cylinder is a double acting air cylinder.

6. A locking system for mounting on a sliding undercarriage of a semitrailer, the semitrailer pulled by a tractor, the locking system used for securing and releasing the sliding undercarriage from a pair of parallel rails mounted on an underside of the semitrailer, the parallel rails having spaced apart locking pin holes along the length thereof, the sliding undercarriage having semitrailer spring operated air brakes operated from a pressurized air source on the semitrailer or tractor, the semitrailer having an electrical power source thereto, the locking system comprising:

an air cylinder with a piston, said air cylinder mounted on the sliding undercarriage and disposed next to the parallel rails;

a locking pin attached to said piston, a portion of said locking pin inserted into a locking pin hole in the parallel rails by the piston;

an air valve connected to said air cylinder and the pressurized air source on the semitrailer or tractor, said air valve directing pressurized air to said air cylinder;

air valve operating means connected to said air valve for operating said air valve when directing pressurized air to said air cylinder; and an air pressure protection means connected to said air valve and connected directly to the pressurized air source on the semitrailer to prevent the depletion of air pressure in the pressurized air source in the operation of the semitrailer's air brakes, said air pressure protection means further preventing the operation of said air valve operating means when the pressurized air from the pressurized air source drops below a predetermined amount.

7. The locking system as described in claim 6 wherein said air valve is pneumatically and electrically operated.

8. The locking system as describe in claim 7 wherein said air pressure protection valve is attached to an air line connected to said air valve, further said air pressure protection valve is connected directly to the pressurized air source.

9. The locking system as described in claim 7 wherein said air pressure protection valve is preset to close when air pressure in the pressurized air source drops below a pressure of 70 psi.

10. The locking system as described in claim 7 wherein said air pressure protection valve includes means for adjusting the amount of air pressure required to open and close said air pressure valve.

11. A locking system for mounting on a sliding undercarriage of a semitrailer, the semitrailer pulled by a tractor, the locking system used for securing and releasing the sliding undercarriage from a pair of parallel rails mounted on an underside of the body of the semitrailer, the parallel rails having spaced apart locking pin holes along the length thereof, the sliding undercarriage having semitrailer spring operated air brakes operated from an air brake line connected to a pressurized air tank on the semitrailer, the air tank receives pressurized air from a tractor air compressor via a supply air line, the locking system comprising:

an air cylinder with a piston, said air cylinder mounted on the sliding undercarriage and disposed next to the parallel rails;

a locking pin attached to one end of a mechanical linkage, another end of said mechanical linkage attached to said piston, a portion of said locking pin inserted into selected locking pin holes in the parallel rails;

an air valve connected to said air cylinder and to an air line connected to the air tank on the semitrailer, said air valve directing pressurized air to said air cylinder;

air valve operating means connected to said air valve for operating said air valve when directing pressurized air to said air cylinder; and an air pressure protection valve connected to said air valve and connected directly to the pressurized air tank to prevent the depletion of air pressure in the pressurized air tank in the operation of the semitrailer's air brakes, said air pressure protection valve further preventing the operation of said air valve operating means when the pressurized air from the pressurized air source drops below a predetermined air pressure amount in a range of 20 to 120 psi.

12. The locking system as described in claim 11 wherein said air pressure protection valve is attached to an air line connected to said air valve, said air pressure protection valve connected directly to the air pressure tank.

13. The locking system as described in claim 11 wherein said air pressure protection valve is preset to close when air pressure in the pressurized air tank drops below 20 psi.

14. The locking system as described in claim 11 wherein said air pressure protection valve includes means for adjusting the amount of air pressure required to open and close said air pressure valve.

15. A locking system for mounting on a sliding undercarriage of a semitrailer, the semitrailer pulled by a tractor, the locking system used for securing and releasing the sliding undercarriage from at least one rail mounted on an underside of the semitrailer, the rail having spaced apart locking pin holes along the length thereof, the sliding undercarriage having spring operated air brakes operated from a pressurized air source on the semitrailer or tractor, the locking system comprising:

a locking pin;

locking pin retraction means attached to said locking pin for retracting said locking pin in a selected locking pin hole in the rail, said retraction means attached to the sliding undercarriage;

locking pin insertion means attached to said locking pin for inserting said locking pin in a selected locking pin hole in the rail, said insertion means attached to the sliding undercarriage; and an air pressure protection means connected to said locking pin retraction means and connected directly to the pressurized air source on the semitrailer to prevent the depletion of air pressure in the pressurized air source in the operation of the semitrailer's air brakes, said pressure protection means for further preventing the operation of said locking pin retraction means when the pressurized air from the pressurized air source drops below a predetermined amount.

16. The locking system as described in claim 15 wherein said locking pin retraction means is an air cylinder with a piston, said air cylinder mounted on the sliding undercarriage, said piston attached to said locking pin.

17. The locking system as described in claim 15 wherein said locking pin retraction means is a pneumatic retraction device attached to a mechanical locking pin linkage system, said locking pin linkage system connected to said lacking pin.

18. The locking system as described in claim 15 further including an air pressure switch and an air valve connected to said locking pin retraction means, said air pressure switch and said air valve connected to the pressurized air source on the semitrailer or tractor.

19. The locking system as described in claim 15 wherein said locking pin retraction means is a pneumatically operated brake pad, said brake pad connected to a mechanical linkage, said mechanical linkage connected to said locking pin.

20. The locking system as described in claim 15 wherein said locking pin insertion means is a coil spring disposed around a portion of said locking pin.

* * * * *